(12) United States Patent
Ye et al.

(10) Patent No.: US 11,875,515 B2
(45) Date of Patent: Jan. 16, 2024

(54) METHOD FOR MORPHOLOGY IDENTIFICATION, TRAJECTORY TRACKING AND VELOCITY MEASUREMENT OF HIGH-CONCENTRATION MICROBUBBLES

(71) Applicant: Zhejiang University, Hangzhou (CN)

(72) Inventors: Qingqing Ye, Hangzhou (CN); Weiqi Sun, Hangzhou (CN); Yihong Chen, Hangzhou (CN); Xueming Shao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/132,444

(22) Filed: Apr. 10, 2023

(65) Prior Publication Data
US 2023/0326038 A1    Oct. 12, 2023

(30) Foreign Application Priority Data

Apr. 12, 2022  (CN) .......................... 202210376642.6

(51) Int. Cl.
G06T 7/215 (2017.01)
G06T 7/12 (2017.01)
(Continued)

(52) U.S. Cl.
CPC ................ G06T 7/215 (2017.01); G01P 5/26 (2013.01); G06T 5/002 (2013.01); G06T 5/30 (2013.01);
(Continued)

(58) Field of Classification Search
CPC .......... G06T 7/215; G06T 5/002; G06T 5/30; G06T 7/12; G06T 7/155; G06T 7/62;
(Continued)

(56) References Cited

U.S. PATENT DOCUMENTS 11,083,435 B2 *  8/2021  Moshavegh ........... A61B 8/481
2002/0065467 A1 *  5/2002  Schutt ...................... A61B 8/06
600/458
(Continued)

FOREIGN PATENT DOCUMENTS

CN    103177248 A    6/2013
CN    103425967 A    12/2013
(Continued)

OTHER PUBLICATIONS

Sun Weiqi, Dynamics of droplets evaporation and atomization in solution precursor plasma spray, Master's Thesis School of Aeronautics and Astronautics Zhejiang University, 2018, pp. 1-54.
(Continued)

Primary Examiner — Jose L Couso
(74) Attorney, Agent, or Firm — Bayramoglu Law Offices LLC

(57) ABSTRACT

A method for morphological identification, trajectory tracking, and velocity measurement of high-concentration microbubbles, includes collecting images of a microbubble group, performing image pre-processing, segmenting overlapped pixel blocks of the image of the microbubbles, identifying the image of the microbubbles, obtaining morphological information of each of the microbubbles, obtaining an equivalent diameter of each of the microbubbles, calculating a size distribution of the microbubbles; correlating the images of the microbubbles at two adjacent instants, and obtaining a velocity field and motion trajectory of the microbubbles. The method applies to morphological identification and correlation of high-concentration microbubbles and obtains the particle size distribution and velocity field information of the microbubbles.

8 Claims, 12 Drawing Sheets

(51) Int. Cl.
*G06T 7/155* (2017.01)
*G06T 7/62* (2017.01)
*G06T 5/00* (2006.01)
*G01P 5/26* (2006.01)
*G06T 5/30* (2006.01)

(52) U.S. Cl.
CPC .............. *G06T 7/12* (2017.01); *G06T 7/155* (2017.01); *G06T 7/62* (2017.01); *G06T 2207/20021* (2013.01); *G06T 2207/20036* (2013.01); *G06T 2207/30204* (2013.01); *G06T 2207/30241* (2013.01); *G06T 2207/30242* (2013.01)

(58) Field of Classification Search
CPC . G06T 2207/20021; G06T 2207/20036; G06T 2207/30204; G06T 2207/30241; G06T 2207/30242; G06T 7/20; G06T 7/248; G06T 7/0012; G06T 7/0016; G06T 7/11; G06T 2207/20024; G06T 2207/20032; G06T 2207/20104; G06T 2207/10016; G06T 2207/10132; G06T 2207/301001; G06T 2207/30104; G01P 5/26; G01P 5/00; G06V 20/41; G06V 20/46; G06V 10/25; G06V 40/193; A61B 8/06; A61B 8/08; A61B 8/469; A61B 8/481; A61B 8/52; A61B 8/5269; A61B 8/5215; A61B 8/0891; A61B 8/085; A61B 8/5207; A61B 8/5223; A61B 8/463; A61B 8/467; A61B 8/13; A61B 8/5253; H04N 21/431; H04N 21/4312; H04N 21/4314; H04N 21/44218; H04N 21/4858
See application file for complete search history.

(56) References Cited

U.S. PATENT DOCUMENTS

| | | | |
|---|---|---|---|
| 2007/0196005 | A1 | 8/2007 | White et al. |
| 2008/0015440 | A1* | 1/2008 | Shandas ............... A61B 8/13 600/458 |
| 2011/0117028 | A1* | 5/2011 | Zharov ............... A61B 8/08 424/9.3 |
| 2014/0147013 | A1* | 5/2014 | Shandas ............... A61B 8/481 382/107 |
| 2020/0178939 | A1* | 6/2020 | Song ............... A61B 8/52 |
| 2020/0187910 | A1* | 6/2020 | Pinton ............... A61B 8/085 |
| 2020/0305840 | A1* | 10/2020 | Sboros ............... A61B 8/5207 |
| 2021/0014563 | A1 | 1/2021 | Baughman et al. |
| 2022/0071596 | A1* | 3/2022 | Wang ............... A61B 8/0891 |
| 2022/0245763 | A1* | 8/2022 | Yin ............... G06T 7/70 |
| 2022/0292637 | A1* | 9/2022 | Huang ............... G06T 3/4007 |

FOREIGN PATENT DOCUMENTS

| | | | | |
|---|---|---|---|---|
| CN | 107705318 | A | 2/2018 | |
| CN | 108020168 | A | 5/2018 | |
| CN | 109272548 | A | 1/2019 | |
| CN | 110415257 | A | 11/2019 | |
| CN | 111553085 | A | 8/2020 | |
| CN | 113838089 | A | 12/2021 | |
| EP | 2434273 | A2 * | 3/2012 | ......... B41J 2/04535 |
| GB | 2507368 | A * | 4/2014 | ............. E21B 47/10 |

OTHER PUBLICATIONS

Dimitri Ackermann, et al., Detection and Tracking of Multiple Microbubbles in Ultrasound B-Mode Images, IEEE Transactions on Ultrasonics, Ferroelectrics, and Frequency Control, 2016, pp. 72-82, vol. 63, No. 1.

* cited by examiner

METHOD FOR MORPHOLOGY IDENTIFICATION, TRAJECTORY TRACKING AND VELOCITY MEASUREMENT OF HIGH-CONCENTRATION MICROBUBBLES

CROSS-REFERENCE OF THE RELATED APPLICATION

This application is based upon and claims priority to Chinese Patent Application No. 202210376642.6, filed on Apr. 12, 2022, the entire content of which is incorporated herein by reference.

TECHNICAL FIELD

The present disclosure relates to the field of microbubbles image identification and processing, and in particular to a method for morphological identification, trajectory tracking, and velocity measurement of high-concentration microbubbles in a flow field. This method is to realize morphological identification, particle size statistics, trajectory tracking, and velocity calculation of each microbubble in a flow field filled with high-concentration microbubbles.

BACKGROUND

The noise produced by underwater vehicles in the working process has a serious impact on the cloaking property of ships and submarines as well as underwater ecological environment. As one of the common means of noise reduction for underwater vehicles, microbubbles can change the propagation mode of sound waves by dissipating energy, thus effectively suppressing the propagation of noise. The influence of microbubbles on sound waves depends largely on the characteristic parameters of microbubbles and the relative motion pattern of microbubbles in the fluid. Therefore, it is of great significance to parameterize the characteristics of microbubbles, track the motion trajectory of microbubbles, and analyze the velocity characteristics of microbubbles to study the noise reduction characteristics of microbubbles.

The attenuation effect of microbubbles on sound waves depends on the characteristics of microbubbles such as particle size distribution and concentration. The traditional acoustic dispersion method can measure the parameters of microbubbles, but it has high requirements on the test environment and is difficult and complex to be implemented. With the development of optical imaging technology, the non-contact optical imaging method has become an important technical approach for microbubble research. However, due to the small particle size of microbubbles, generally on the order of micrometers, in the case of high-concentration and thick-layer bubbles, the two-dimensional (2D) bubble image captured by the camera often has problems such as bubble overlapping and bubble boundary blurring. This greatly affects the accuracy of morphological identification and subsequent velocity field calculation, and further affects the measurement of the flow field, the assessment and control of the effect of noise attenuation. Therefore, it is particularly important to develop a high-accuracy morphological identification and trajectory-tracking method suitable for high-concentration microbubbles. In addition, the traditional bubble imaging technology often uses a low-velocity imaging method, which lacks sufficient time resolution to obtain the motion pattern of bubbles in the fluid and thus cannot process the formation, evolution, and breaking process of bubbles. Therefore, it is necessary to use a high-speed imaging method to break the limits of the traditional low-velocity imaging method on the space-time analysis of microbubbles to facilitate the capture of the space-time evolution characteristics of microbubbles.

SUMMARY

Given the problems described in the background, an objective of the present disclosure is to perform morphological identification of a high-concentration microbubbles, obtain particle size distribution information of microbubbles through a high-speed image technology, and analyze a temporal correlation based on an identified bubble image to obtain a motion trajectory and velocity field of the microbubbles. In essence, the present disclosure provides a solution for morphological identification, characteristic extraction of spatial distribution and motion property of a high-concentration microbubbles.

An example of the present disclosure provides a method for morphological identification and velocity measurement of a high-concentration microbubbles, which specifically includes:

1) Initial images of the microbubbles are collected using a high-speed complementary metal-oxide semiconductor (CMOS) camera.

2) high time-resolution image of the microbubbles is provided as input for pre-processing, where the pre-processing includes binarization, noise removal, filling, and erosion of the image. After the binarization, the gray level of a pixel is set to 1 in a bubble region and 0 in a non-bubble region.

3) Overlapped pixel blocks in the pre-processed image are segmented based on the spatial distribution of the microbubbles.

4) The boundary of the segmented image is identified. Morphological information about each of the microbubbles is obtained. Morphological matching is performed. An equivalent diameter of all the microbubbles in the microbubble group is calculated, and diameter distribution information is obtained.

5) Images of the microbubbles at two adjacent instants are correlated. Instantaneous velocity field information of the microbubble group is obtained. A velocity vector of an obtained velocity field is corrected. A motion trajectory and direction of the microbubble group are displayed.

As a preferred solution of the present disclosure, in step 1), the high-speed CMOS camera obtains high time-resolution images of the microbubbles with a time resolution of up to 10 kH. A test region is illuminated by a high-energy continuous light-emitting diode (LED) light source.

As a preferred solution of the present disclosure, in step 2), on the premise that the image of the microbubbles obtained in step 1) is basically clear, the image of the microbubbles is pre-processed, including basic operations such as binarization, noise removal, filling, and erosion.

In the binarization operation, a background image without microbubbles is used as a base image, and the base image is subtracted from a target image of the microbubbles. The gray level difference of each pixel block in an obtained image is compared with the base image. If the gray level difference of a pixel block is greater than a specific threshold (for example, 50% of the gray level of each pixel in a corresponding pixel region of the base image), the pixel block is considered as the region where the microbubble is located, and the gray level of each pixel in the region is set to 1 (that is, pure white, corresponding to an initial gray level of 255). On the contrary, the gray level of each pixel in the region is set to 0 (that is, pure black, corresponding to an initial gray level of 0) to obtain a complete binary image.

To further improve the definition of the image of the microbubbles, it is necessary to remove noise in the obtained binary image. Specifically, a noise signal in the initial image of the microbubbles is identified, and a pixel area threshold is dynamically set for the binary image according to an identification result. If the area of a pixel block in the binary image is higher than this threshold (essentially a lower limit of the pixel area), the pixel block is retained. Otherwise, the pixel block is deleted. To avoid getting a non-microbubble signal with a too-large diameter, a second threshold may also be given as an upper limit of the area of the pixel block. All retained pixel blocks form a desired image of the microbubbles.

Generally, the images of the microbubbles taken by a high-speed camera may have blurred microbubble edges and overexposed core due to insufficient depth of field and the impact of reflection. Therefore, it is necessary to carry out basic filling and edge erosion treatment on the binary image after removing the noise. First, each pixel block of the microbubble in the binary image after the noise removal is filtered to find out the pixel with the gray level of 0 in the bubble region, and the pixel is filled with 1. Meanwhile, an edge of each pixel block of the microbubble is eroded based on a given morphological parameter, and the treatment result does not affect the initial morphology of the microbubble.

After the basic filling and erosion of the binary image, all pixel blocks form an effective image of the microbubbles. In the case of high-concentration microbubbles, especially a large number of microbubbles with a small particle size and a large differences in particle size between the microbubbles, small and large bubbles are likely to overlap. In this case, the overlapped pixel blocks need to be segmented.

Preferably, step 3) specifically performed as follows.

The binary image of the microbubbles processed in step 2) is subjected to a NOT operation to obtain a new binary image, and the gray level of the pixel block in the initial bubble region is 0. Distance transformation is performed on the new binary image. That is, for all pixels in the binary image, the distance of the closest pixel with a non-zero gray level is calculated. The obtained distance is used to cover the initial gray level to obtain a new gray level image.

A pixel matrix corresponding to the gray level image obtained by the distance transformation is multiplied by a coefficient of −1, such that there is a local minimum gray level at the corresponding positions of all microbubble pixels (target pixel region). The number of all pixels with the minimum gray level in the region is determined, and the minimum gray levels of these pixels are marked as 1.

For the binary image with the local minimum gray level, the distance transformation is performed again to obtain a new gray level image. Watershed regions of the gray level image are obtained by watershed transformation and are marked to obtain a label matrix. The label matrix records attributes of all segmented pixel blocks of the microbubbles, including pixel area and mass centroid information.

All pixels with the gray level of 0 in the obtained new gray level image are adjusted to change the gray level to 1. The gray level of other pixels in the image is adjusted to 0. Thus, a new binary image is obtained. The purpose of this step is to convert the gray level image obtained by the watershed transformation into a new binary image to prepare for the subsequent extraction of a microbubble segmentation boundary.

The obtained new binary image is subjected to a NOT operation, and the obtained new matrix is taken as a segmentation factor matrix.

The segmentation factor matrix is multiplied by the binary image matrix of the microbubbles obtained in step 2) to obtain a segmented binary image.

The key to microbubble image segmentation is to repeatedly perform distance transformation and watershed transformation and finally obtain the boundary of overlapping pixel blocks of the microbubbles. In the gray level image obtained by the NOT operation and the distance transformation on the binary image in step 2), the local minimum gray level of all pixels in each pixel region (target pixel block) of the microbubbles is investigated, which needs to consider the overall overlap of the microbubble pixel image. For example, when each overlapping microbubble includes 2-3 microbubbles that are originally independent, it is generally required to obtain 2-3 minimum gray levels from each overlapping pixel region. The number of the minimum gray levels will directly affect the effect of microbubble segmentation and morphological information and other relevant features of the microbubbles.

After the operation of microbubble segmentation, morphological identification is required to obtain key information such as the size and position of the microbubble. As an optional solution of the present disclosure, step 4) includes: identifying the boundary of the segmented image, obtaining morphological information of each of the microbubbles, performing morphological matching, calculating an equivalent diameter of all the microbubbles in the microbubble group, and obtaining diameter distribution information.

The steps of identifying the boundary of the segmented image, obtaining morphological information of each of the microbubbles, and performing morphological matching specifically include: performing ellipse fitting on the boundary of each microbubble, determining an ellipse that best conforms to the boundary of the microbubble, recording major and minor axes of the ellipse, and determining the mass centroid information. When the boundary of the microbubble is fitted, the ellipse fitting method to fit the boundary of the two-dimensional image of the microbubbles has high accuracy if the morphology of the spherical microbubble does not change much.

After the independent pixel region of the microbubble is obtained, the label matrix including the pixel area and mass centroid of each microbubble is output, and the mass centroid of each microbubble is recorded by the label matrix.

After the image of the microbubbles is identified, the distribution characteristics of the microbubbles are extracted, mainly including the particle size distribution, which is related to the size uniformity of the microbubbles in the microbubble group.

In step 4), the calculating an equivalent diameter of all the microbubbles in the microbubble group, and obtaining diameter distribution information specifically includes: obtaining the particle size of each microbubble based on the semi-major and semi-minor axes corresponding to an elliptic boundary of the microbubble, calculating proportions of different particle sizes of the microbubbles, and obtaining a distribution of the particle sizes.

The statistics of the particle size distribution of the microbubbles is mainly divided into two parts: obtaining the particle size of each microbubble based on the semi-major and semi-minor axes corresponding to an elliptic boundary of the microbubble and calculating proportions of different particle sizes of the microbubbles.

The particle size of each microbubble is estimated to be ½ (a+b), where a and b denote the semi-major axis and semi-minor axis of the elliptic boundary identified. After obtaining the particle sizes of different microbubbles, the proportion of each particle size is calculated to construct an approximate distribution of the particle size.

In the present disclosure, step 5) includes: correlating images of the microbubbles at two adjacent instants, obtaining instantaneous velocity field information of the microbubble group, correcting a velocity vector of an obtained velocity field, and displaying a motion trajectory and direction of the microbubble group.

The position information of the microbubbles records the dynamic characteristics of the microbubbles. Correlating images of the microbubbles at different instants is the basis for further obtaining the velocity information of the microbubbles. This step is mainly to analyze the correlation of binary images of the microbubbles after identification at different instants to obtain a spatial correspondence.

When the microbubble is located at an edge of the image, an interrogation window for correlation cannot be centered on the mass centroid of the microbubble due to boundary cutting. Thus, the microbubble is located at the edge of the interrogation window. The image can be correlated with each reference matrix in the image of the microbubbles at the next instant to obtain a correlation coefficient.

In step 5), the step of obtaining instantaneous velocity field information of the microbubble group specifically includes: calculating a change rate of displacement to time according to the correspondence of each microbubble at different instants to obtain the velocity and direction and marking a velocity vector in the initial image of the microbubbles.

The position of the microbubble changes slightly in the image of the microbubbles taken by the high-speed camera at each instant. After the positions of the microbubbles at different instants are correlated, the change rate of each microbubble's displacement to time can be used as the velocity at the current instant. Thus, the velocity field of all microbubbles at each instant can be obtained.

In step 5), the step of correcting a velocity vector of an obtained velocity field specifically includes: determining a microbubble incorrectly correlated with a reference matrix region in the image of the microbubbles at the next instant due to the interrogation window (after the correlation of the image of the microbubbles at the next instant) and correcting an incorrect velocity vector on a marked velocity field image to conform to an actual physical motion trajectory. A basic principle for correction includes that the velocity of the microbubble cannot have a sudden change and the velocity direction of the microbubble is consistent with the real motion direction of the microbubble.

Since the actual shooting interval of each image of the microbubbles can reach 0.1 ms, the velocity of the microbubble changes slightly. The velocity field presented is in a gradual trend, and the velocity vector with abnormal velocity change (exceeding an expected value) is deleted. Meanwhile, the image of the microbubbles records the real motion information of the microbubble, and the marked velocity field direction cannot violate the actual motion direction of the microbubble. When the direction of the velocity vector changes abnormally (more than a certain angle) compared with the information at the adjacent instant, the velocity vector is deleted.

In step 5), the step of displaying a motion trajectory and direction of the microbubble group specifically includes: determining the correspondence of each microbubble at different instants based on the obtained correlation information of the microbubbles to determine the motion direction of the microbubble, overlapping motion positions of the same microbubble at different instants in a same image to obtain the motion trajectory of the microbubble, and marking the velocity vector of the microbubbles on the initial image of the microbubbles to visualize the velocity field of the microbubbles.

Compared with existing techniques, the present disclosure has the following beneficial effects:

(1) The method of high-accuracy image segmentation and error ellipse fitting is adopted to segment and identify the image of the high-concentration microbubbles, and the morphological and position information of the microbubbles is obtained. It overcomes the problem that the morphological characteristics of high-concentration microbubbles cannot be accurately extracted and identified and lays the foundation for studying the dynamic characteristics of microbubbles.

(2) High-speed image acquisition technology is used to combine microbubble image processing and microbubble kinematics analysis, and the extracted morphological and position information of the microbubbles is directly used for kinematics analysis. It avoids the discontinuity and incompatibility of the current morphological and position information acquisition and kinematics analysis of the microbubble group and makes the results of subsequent microbubble kinematics and dynamics analysis (such as velocity field acquisition) more accurate.

DETAILED DESCRIPTION OF THE EMBODIMENTS

The specific implementations of the present disclosure are illustrated with examples in conjunction with the drawings. It should be noted that the following is only an application example of the present disclosure, and the present disclosure is not limited to the image of the microbubble group in this example.

Figure 1:
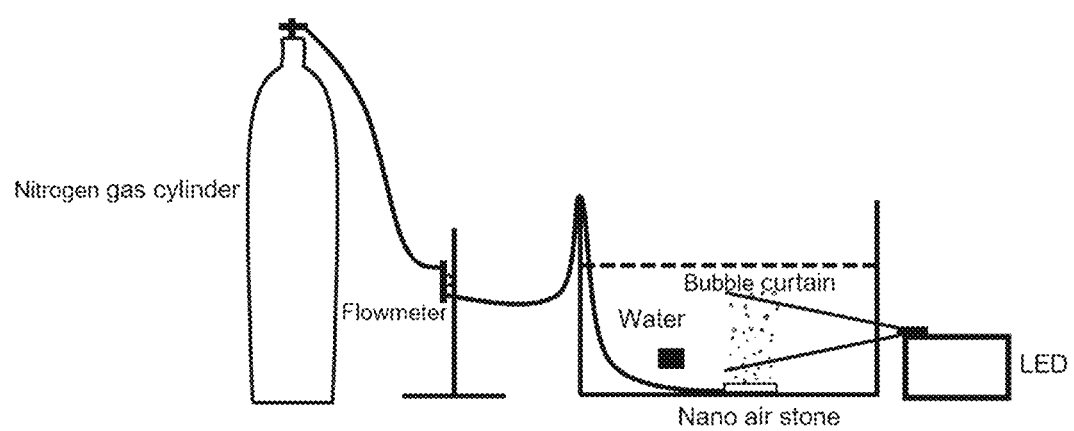
FIG. 1 is a schematic diagram of an experimental microbubble generation and image collection device according to an embodiment of the present disclosure.

Microbubbles are produced by a microporous ceramic. FIG. 1 shows a microbubble generator, which releases nitrogen at a certain pressure from a nitrogen gas cylinder and aerates the microporous ceramic by controlling the flow to generate a microbubble group and form a bubble curtain in a water tank. In the experiment, the concentration and distribution of the microbubbles are controllable. After the bubble curtain is generated stably, a floating image of the microbubble group is recorded by a high-speed camera at a certain depth of field to provide the initial microbubble attribute information for subsequent processing.

Figure 2:
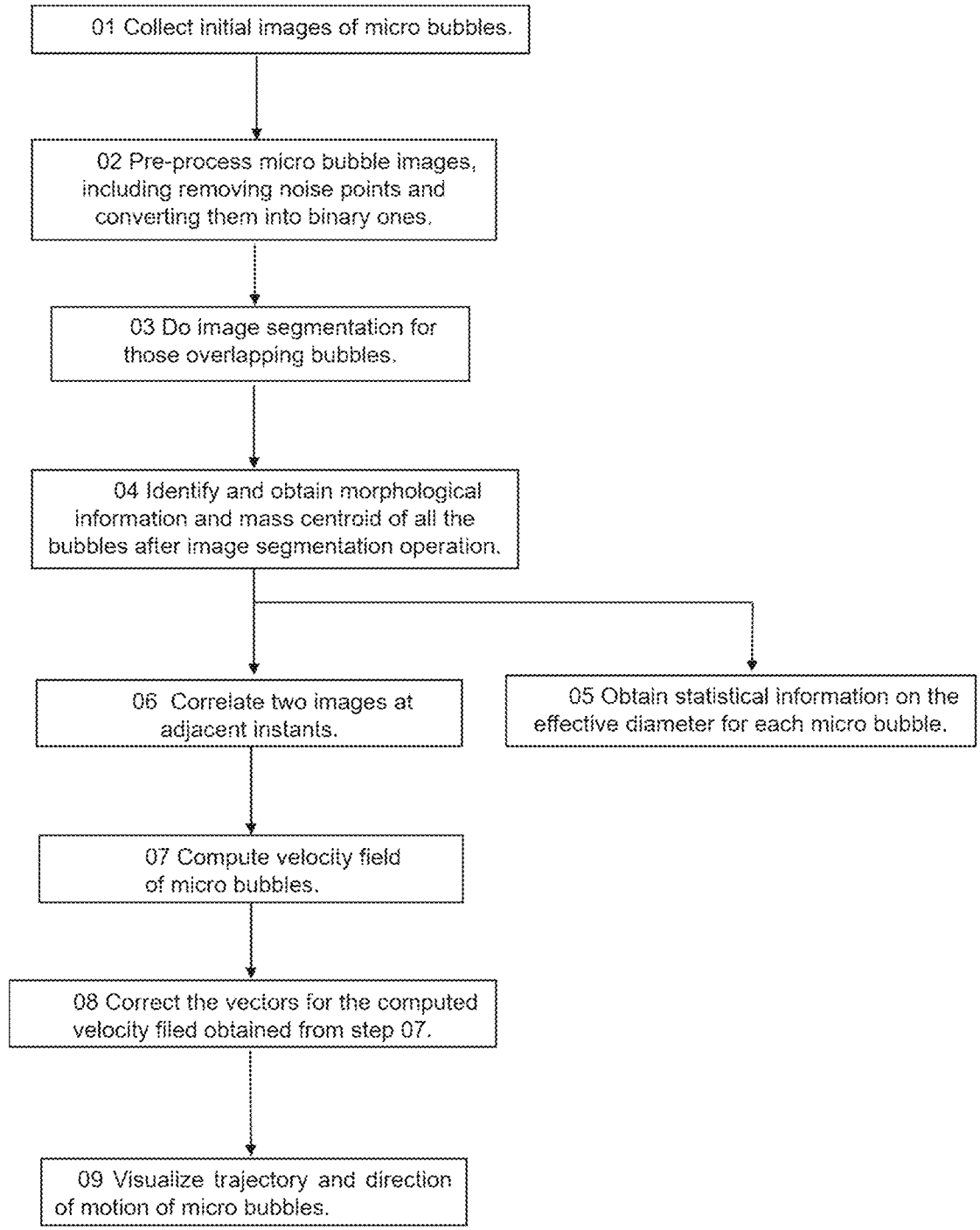
FIG. 2 is a basic flowchart of the method corresponding to the present disclosure.

FIG. 2 is a basic flowchart of a method according to a specific embodiment of the present disclosure. In this embodiment, the method includes 9 specific steps.

1) Initial images of the microbubbles are collected using a high-speed complementary metal-oxide semiconductor (CMOS) camera with a time resolution of up to 10 kH.

2) A high time-resolution image of the microbubbles is input for pre-processing, where the pre-processing includes binarization, noise removal, filling, and erosion of the image.

3) Overlapped pixel blocks in the pre-processed image are segmented based on a spatial distribution of the microbubbles.

4) The boundary of the segmented image of the microbubbles is identified, morphological information of each microbubble is obtained, and morphological matching is performed.

5) An equivalent diameter of all the microbubbles in the microbubble group is calculated, and diameter distribution information is obtained.

6) A correlation analysis is performed on images of the microbubbles at two adjacent instants.

7) Instantaneous velocity field information of the microbubble group is obtained.

8) A velocity vector of an obtained velocity field is corrected.

9) A motion trajectory and direction of the microbubble group are displayed.

The above steps are described in detail below.

Figure 3:
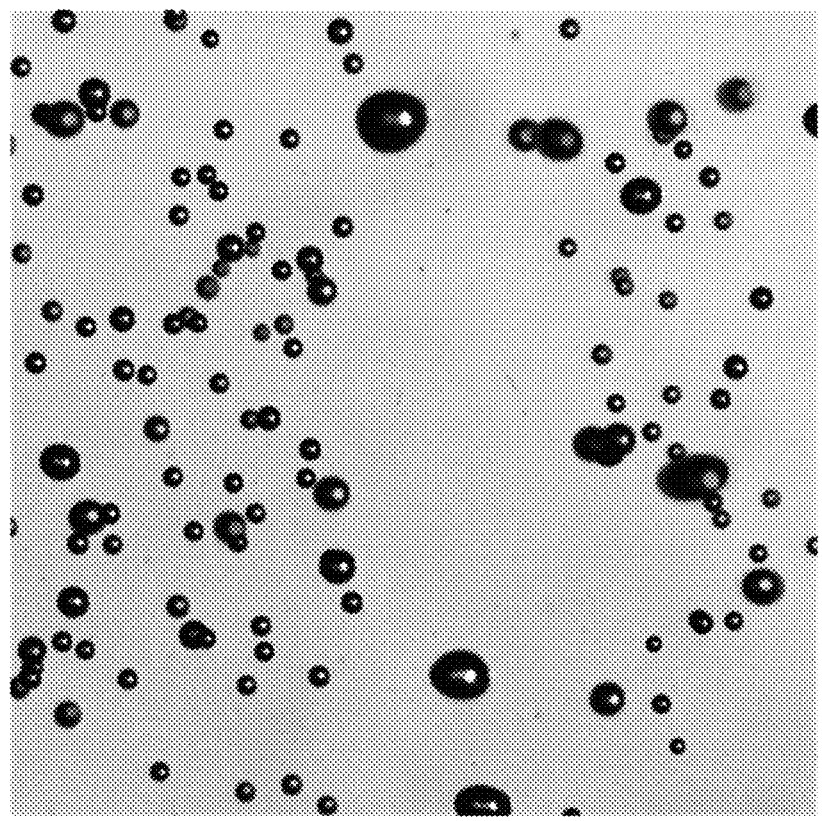
FIG. 3 shows a bubble image collected by a high-speed camera according to an embodiment of the present disclosure.
Figure 4:
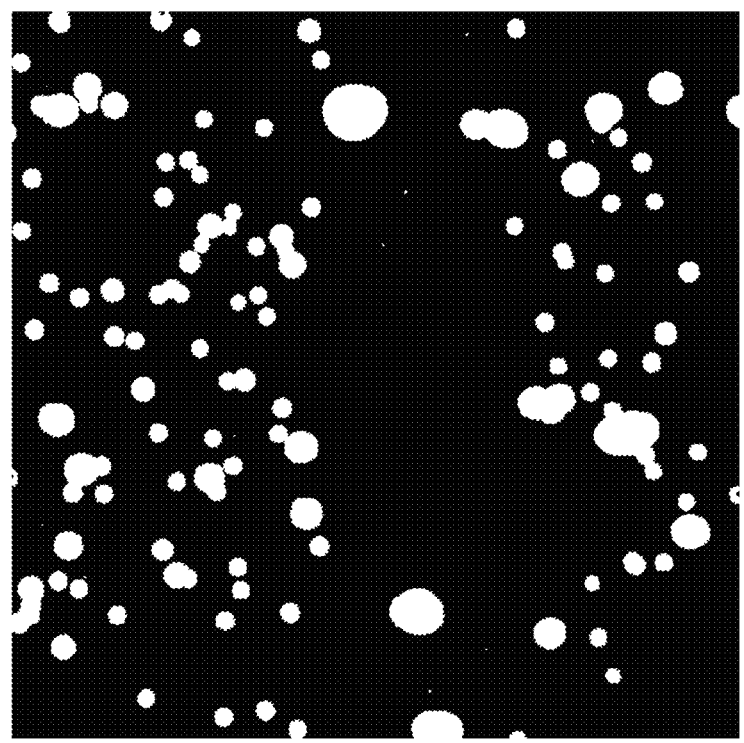
FIG. 4 shows a binary image converted from the bubble image through binarization.

After the microbubble group is generated by the microporous ceramic, the image of the microbubbles is collected by the high-speed camera, as shown in FIG. 3. The image of the microbubbles is converted into a binary image shown in FIG. 4 through binarization. The binarization method is used to compare the initial image with a background image (without any microbubbles), identify a region with a pixel fluctuation greater than 50% as a microbubble, set the gray level of a pixel to 1 for the bubble region, and to 0 in a region other than the bubble region.

The binary image includes some non-microbubble noise signals. A lower pixel threshold is set for the binary image. All pixels with the gray level of 1 form a target region. When an area of a pixel block in the target region is higher than a specific value, it is considered a real microbubble. Alternatively, an upper pixel threshold is set to avoid the microbubble from being identified as one with a too-large diameter. Specifically, the gray level of the total pixel area inside the upper and lower thresholds is set to 1—while that of the total pixel area outside the upper and lower thresholds is set to 0. All pixels with the gray level of 1 form a microbubble pixel region, and those with the gray level of 0 forms a non-microbubble pixel region.

The binary image of the microbubbles with the noise removed is basically filled and eroded. First, each pixel block (microbubble pixel block) in the binary image is filtered to find out a pixel with the gray level of 0 in a center of the microbubble, and the gray level of the pixel is changed into 1 to achieve a filling effect. Meanwhile, according to a specific shape (for a specific pixel structure element region, the pixel gray level is 1, such as a disc shape), the edge of each pixel block is subjected to reasonable erosion without affecting the morphology of the microbubble. For example, the gray level of the pixel that exceeds the disc-shaped structure element region is set to 0. The obtained binary image includes a noise-free binary matrix with all the microbubble pixel blocks.

Figure 5:
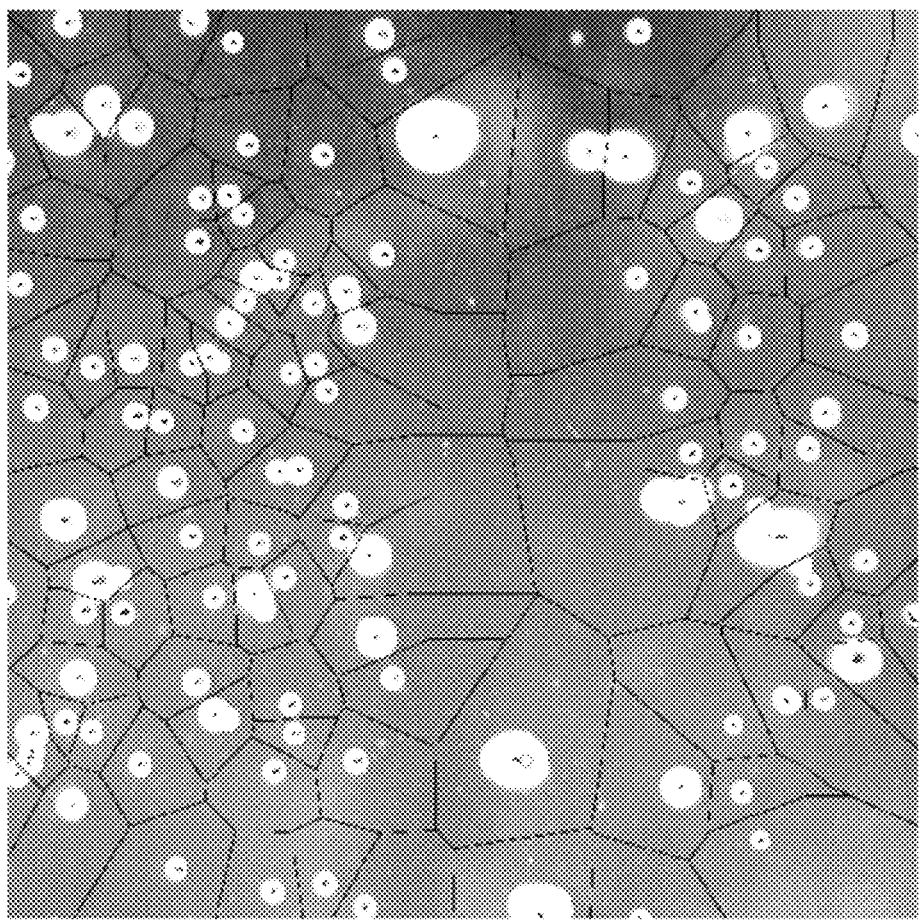
FIG. 5 shows an overlapping effect of a bubble image segmentation boundary and a bubble gray level image.
Figure 6:
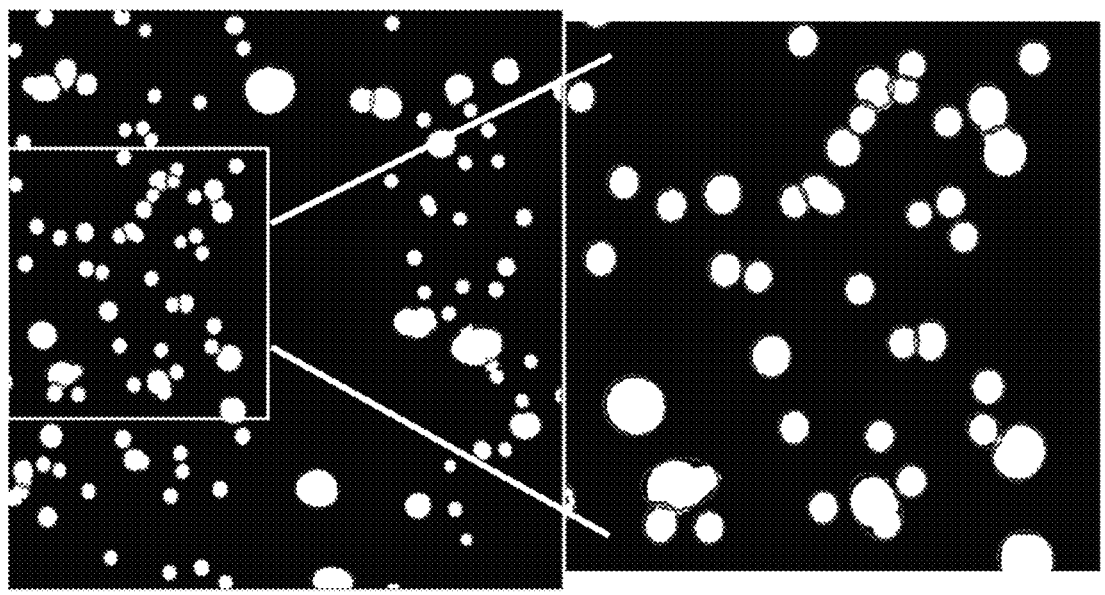
FIG. 6 shows a binary image obtained by performing bubble segmentation and marking on the bubble image.

The image of the microbubbles is segmented, as shown in FIGS. 5 and 6. The image of the microbubbles is segmented using a watershed function and a distance transformation function. An appropriate constraint is applied during operation, and each microbubble is divided into an independent region. An error ellipse is drawn (with a given confidence interval of 90%, that is, a 90% probability that all the pixels of the microbubble are inside an elliptic boundary) to mark each microbubble boundary to achieve the purpose of identification and lay a foundation for the subsequent analysis of microbubble attributes. The microbubbles mostly include small spherical bubbles and large bubbles that are easily deformed. Therefore, after the pixel coordinates are extracted, the boundary of the microbubble can be fitted with the ellipse. According to an elliptic equation, a sum of squares of x and y coordinates of the pixels on the microbubble boundary under a certain coefficient is a fixed value. Assuming that the x and y coordinates of all pixels (including the boundary) included in each microbubble conform to a Gaussian distribution, it is further known that x/a and y/b conform to the Gaussian distribution. Since the sum of squares of the two variables conforming to the Gaussian distribution satisfies a chi-square distribution, $(x/a)^2+(y/b)^2$ satisfies the chi-square distribution. Let the x and y coordinates of the pixels of the microbubble boundary satisfy the elliptic equation (when the microbubble boundary is a standard ellipse), then:

$$\left(\frac{x}{a}\right)^2 + \left(\frac{y}{b}\right)^2 = 1,$$

where a and b denote the semi-major axis and semi-minor axis of the ellipse, respectively. Considering that the dispersion degree of pixels in each microbubble is different (that is, the set of x and y coordinates of the pixels corresponds to different variances), when performing ellipse fitting, there are always some pixels inside the microbubble appearing outside the ellipse. Therefore, there is a confidence interval when fitting a specific microbubble through the elliptic boundary. The values of a and b depend on the variances $\sigma_x^2$ and $\sigma_y^2$ of the two data sets composed of all the x and y coordinates of the pixels, that is, the dispersion degrees of the horizontal and vertical coordinates of the pixels on the boundary and inside of the microbubble. Therefore, the semi-major axis and semi-minor axis can be defined by the standard deviations of the x and y coordinates of the pixels to statistically reflect the confidence interval of the corresponding microbubble fitted by the elliptic boundary. Therefore, the standard elliptic equation can be transformed into:

$$\left(\frac{x}{\sigma_x}\right)^2 + \left(\frac{y}{\sigma_y}\right)^2 = s$$

Figure 7:
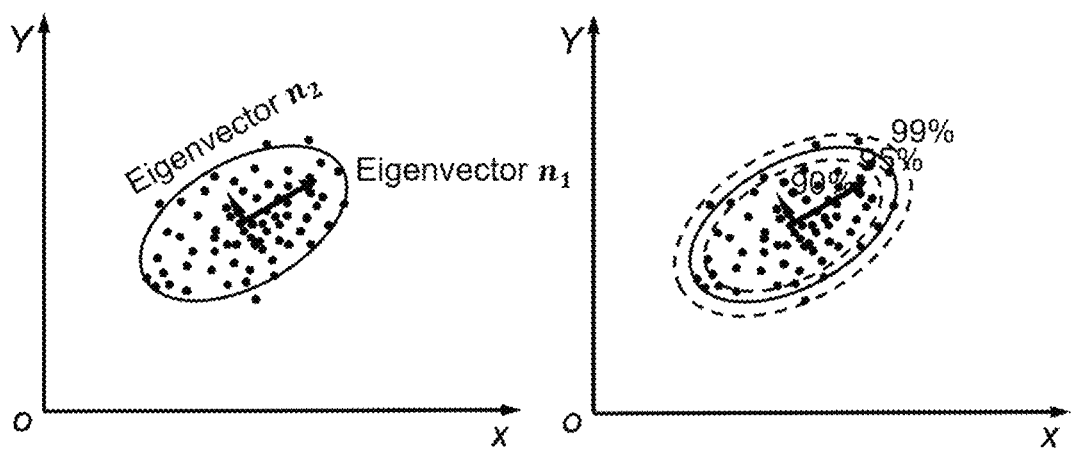
FIG. 7 shows an error ellipse obtained by processing an example image by means of microbubble identification and marking according to an embodiment of the present disclosure.

The ellipse is centered at an origin, and the semi-major and semi-minor axes of the ellipse are aligned with the x and y axes. s is a given value. For a specific microbubble pixel block, a larger s means a larger elliptic boundary and a greater probability of including all the pixels of the microbubble. Therefore, s is statistically related to the confidence interval of the elliptic boundary, and the drawn ellipse is called an error ellipse. When the s value is given, the elliptic boundary is determined, and the dispersion degree of the coordinates of all microbubble pixels included inside the boundary (including the boundary itself) in respective directions is also determined, which can be reflected by the variances of the data sets where the x and y coordinates of the microbubble pixels are located, respectively. Eigenvalues of a covariance matrix reflecting the change trends of the two data sets are $\sigma_x^2$ and $\sigma_y^2$. $\sigma_x$ is the variance of the data set composed of x, and $\sigma_y$ is the variance of the data set composed of y. Therefore, the semi-major axis and the semi-minor axis of the elliptic boundary depend on the values of $\sigma_x$, $\sigma_y$ and s, and their orientations are the two directions with the largest dispersion degree of all pixels inside. For an ellipse with arbitrary orientation and not centered at the origin, its semi-major axis and semi-minor axis can still be defined similarly as the above axis-aligned ellipse. As shown in the left part of FIG. 7, $n_1$ and $n_2$ denote eigenvectors in the two directions with the largest change in the pixel coordinates (the largest variance), $a=\sigma_x\sqrt{s}$, $b=\sigma_y\sqrt{s}$, $|n_1|=\sigma_x^2$, and $|n_2|=\sigma_y^2$. The length of the major axis is $2a=2\sqrt{s|n_1|}$, and the length of the minor axis is $2b=2\sqrt{s|n_2|}$. Meanwhile, an angle $\alpha$ between the major axis and the X-axis can be calculated from the eigenvector n(x,y) (i.e. $n_1$ in the left part of FIG. 7) corresponding to the largest eigenvalue of the covariance matrix (major axis correlation), $$\alpha = \arctan\frac{|n_y|}{|n_x|}.$$

$n_x$ and $n_y$ denote components of the eigenvectors in X and Y directions, respectively.

Figure 8:
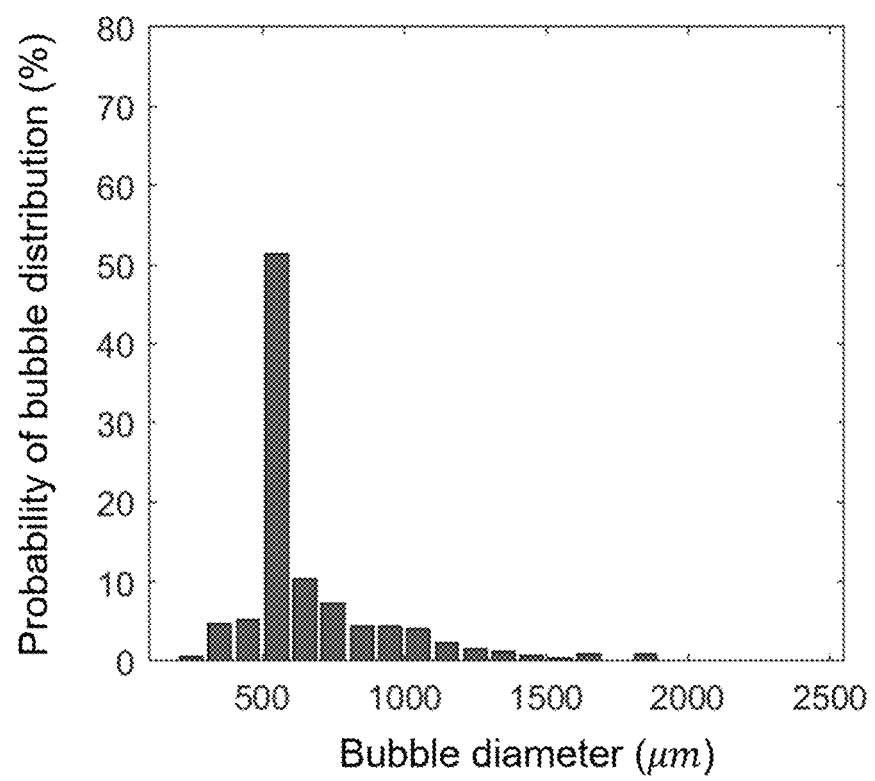
FIG. 8 shows a statistical result of bubble size distribution according to an embodiment of the present disclosure.

The semi-major axis and semi-minor axis of the ellipse are related to the dispersion degree of pixel coordinates and the s value given by the boundary ellipse equation, and the given s value is related to the confidence of the elliptic boundary of the fitted microbubble. The dispersion degree ($\sigma_x$, $\sigma_y$) of pixel coordinates can be calculated, and the value of s needs to be determined. The s value on the right of the elliptic equation of all pixels that satisfy minimum bounding obeys the chi-square distribution. Given a confidence interval $P(s<\lambda)$ in the cumulative chi-square distribution, $\lambda$ is a constant, then the s value of the elliptic boundary of the fitted pixel can be found, such that the fitted elliptic boundary can most accurately reflect the morphology of the microbubble. The major axis, minor axis, and the angle between the major axis and the X-axis of the ellipse are calculated, and the ellipse is marked in the initial image of the microbubbles. A single elliptic boundary (error ellipse) is shown in the left part of FIG. 7, and the elliptic boundary (error ellipses) with different confidence intervals are shown in the right part of FIG. 7. After obtaining the length of the major axis and the minor axis of the ellipse, an average value of the lengths of the major axis and the minor axis is taken to estimate the particle size of the microbubble for statistics. As shown in FIG. 8, the microbubbles are concentrated between 500 microns and 600 microns.

In the present disclosure, the post-processing of the image of the microbubbles mainly includes the correlation of the image of the microbubbles and the calculation and correction of the velocity vector of the microbubbles.

1) Correlation of the Image of the Microbubbles

Figure 9:
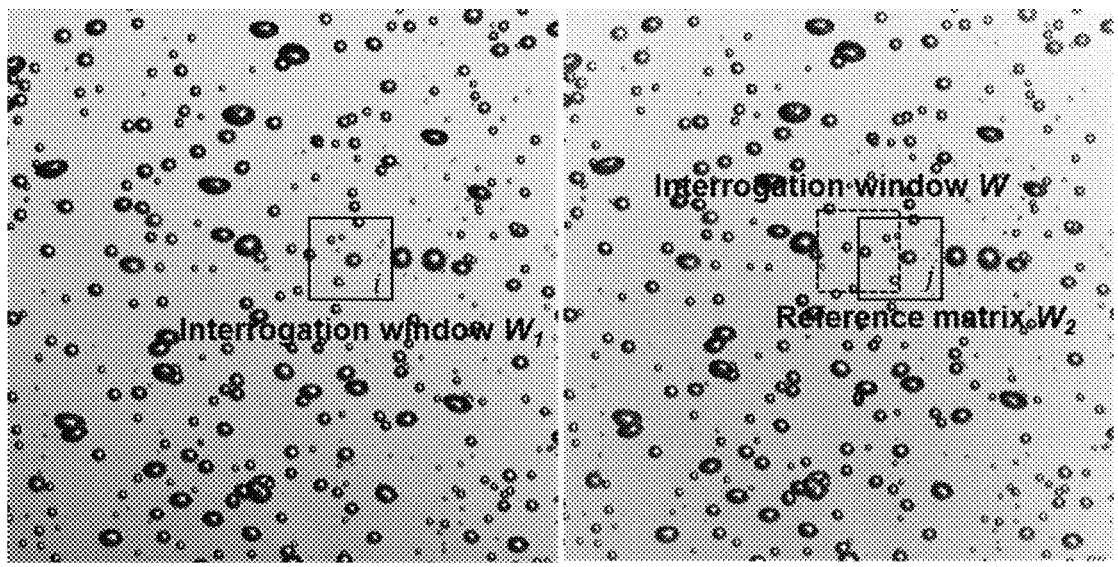
FIG. 9 is a schematic diagram of the correlation of images of a microbubble group at two adjacent instants of time by an image correlation method according to an embodiment of the present disclosure.

To obtain the velocity information of the microbubbles, it is first necessary to correlate the binary images of the microbubbles at each instant obtained after pre-processing, image segmentation, and identification (the images of the microbubbles mentioned below are binary images after microbubble identification) to find out the correspondence between the mass centroids of the microbubble group. The correlation of the image of the microbubbles is determined by a correlation algorithm commonly used in particle tracking and velocity measurement technology. It considers the binary images of the microbubbles at two adjacent instants of time after microbubble identification, as shown in FIG. 9. In the left part of FIG. 9, an i-th microbubble is located in a center of interrogation window $W_1$. The pixels corresponding to all microbubbles in the current window form an initial pixel density matrix. Similarly, in the right part of FIG. 9, corresponding to the left part of FIG. 9, the i-th microbubble corresponds to an interrogation window of the same size. The position of each microbubble included in the current interrogation window W (if the mass centroid of a microbubble is within W, it is considered that the microbubble is within W) is recorded. These microbubbles are respectively taken as centers to form multiple interrogation windows $W_2$ of equal width and height (the pixel density of microbubbles in each interrogation window forms a reference matrix). Finally, the correlation between each reference matrix and the initial pixel density matrix in the left part of FIG. 9 is analyzed to obtain a correlation coefficient. The microbubble corresponding to the center of the reference matrix with the maximum correlation coefficient is the position of the i-th microbubble in the center of the initial pixel density matrix at the next instant.

The correlation coefficient $R_{ij}$ is calculated as follows:

$$R_{ij} = \frac{\sum(W_1 \cap W_2)}{\sqrt{B_1 \times B_2}},$$

where the numerator of the correlation coefficient is defined by the sum of pixel areas in the overlap region of $W_1$ and $W_2$; and $B_1$ and $B_2$ denote the sum of areas of all pixel blocks included in $W_1$ and $W_2$, respectively. i denotes a mark of the microbubble in the center of the interrogation window at the current instant; and j denotes a mark of the microbubble in the center of a pixel matrix selected at the next instant.

In this way, all microbubbles in the image of the microbubbles at the current instant are traversed to find the corresponding microbubbles at the next instant to achieve the purpose of correlating the mass centroid of each microbubble in the image of the microbubbles at the two instants.

2) Calculation and Correction of the Velocity Vector of the Microbubble

Figure 10:
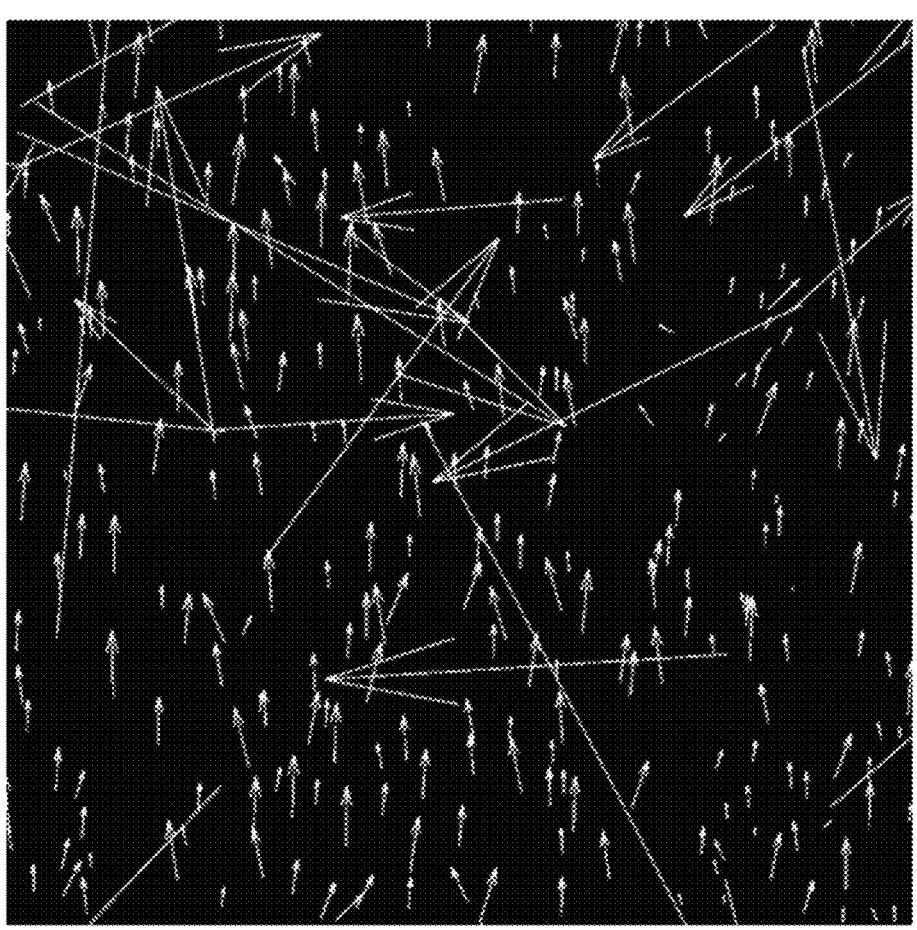
FIG. 10 shows bubble velocity information before velocity vector correction on the bubble image.
Figure 11:
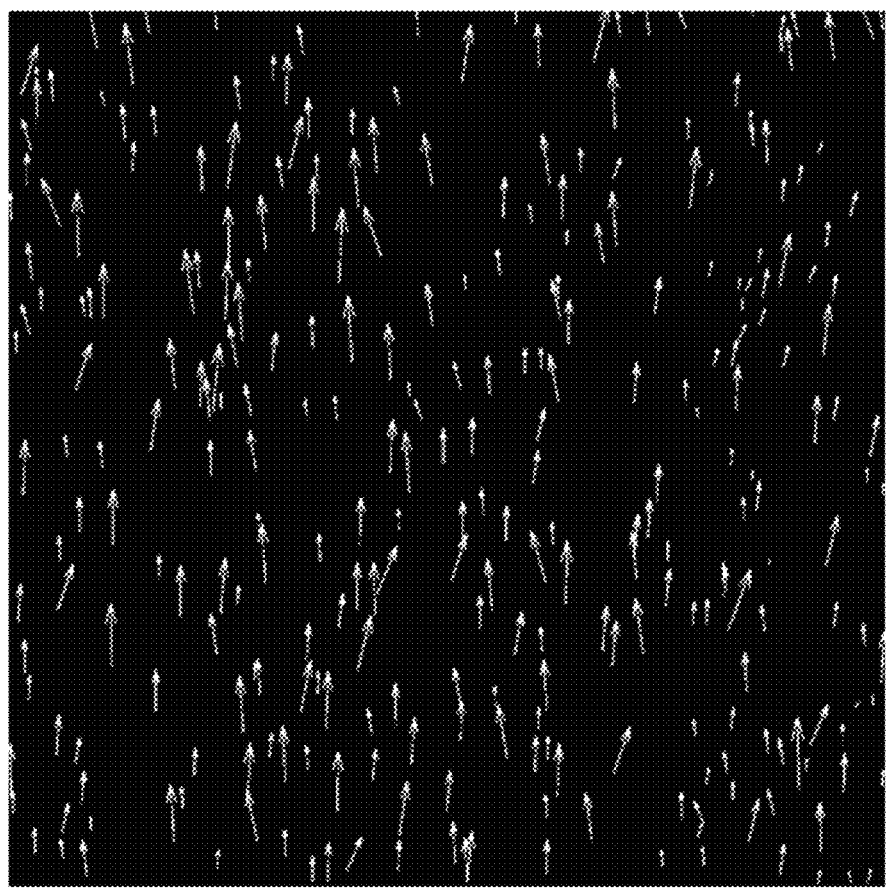
FIG. 11 shows bubble velocity information after velocity vector correction on the bubble image.

After the correlation of the binary images at the adjacent instants is completed, the velocity information of the microbubble can be calculated based on the mass centroid position of each microbubble at the adjacent instants. FIG. 10 shows the velocity information (horizontal and vertical velocities) of the microbubble group calculated after the images of the microbubbles at two instants are correlated. The corrected velocity vector of the microbubble is shown in FIG. 11.

Figure 12:
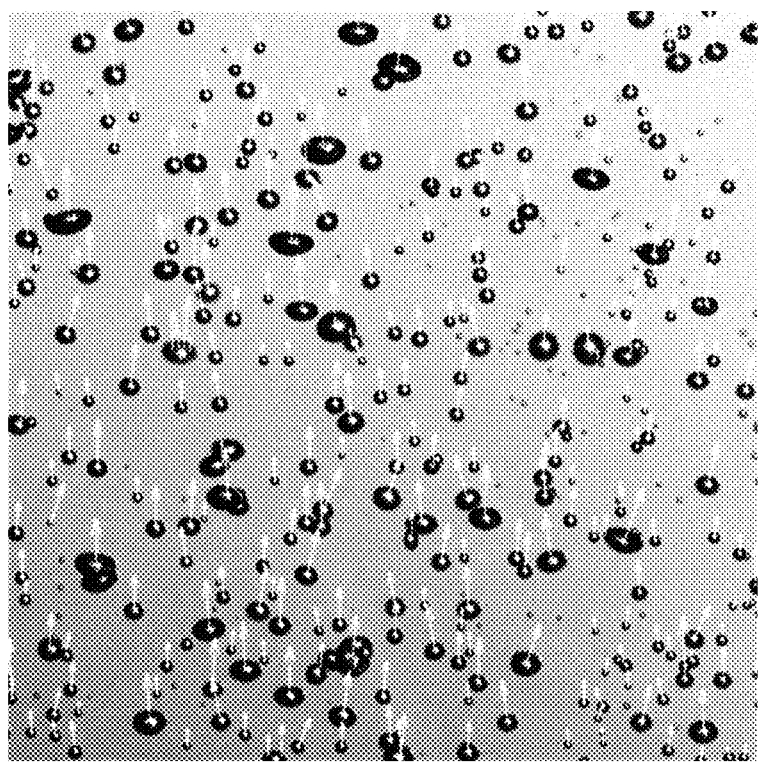
FIG. 12 shows an overlapping result of a microbubble velocity field after velocity correction with the initial bubble image according to an embodiment of the present disclosure.
Figure 13:
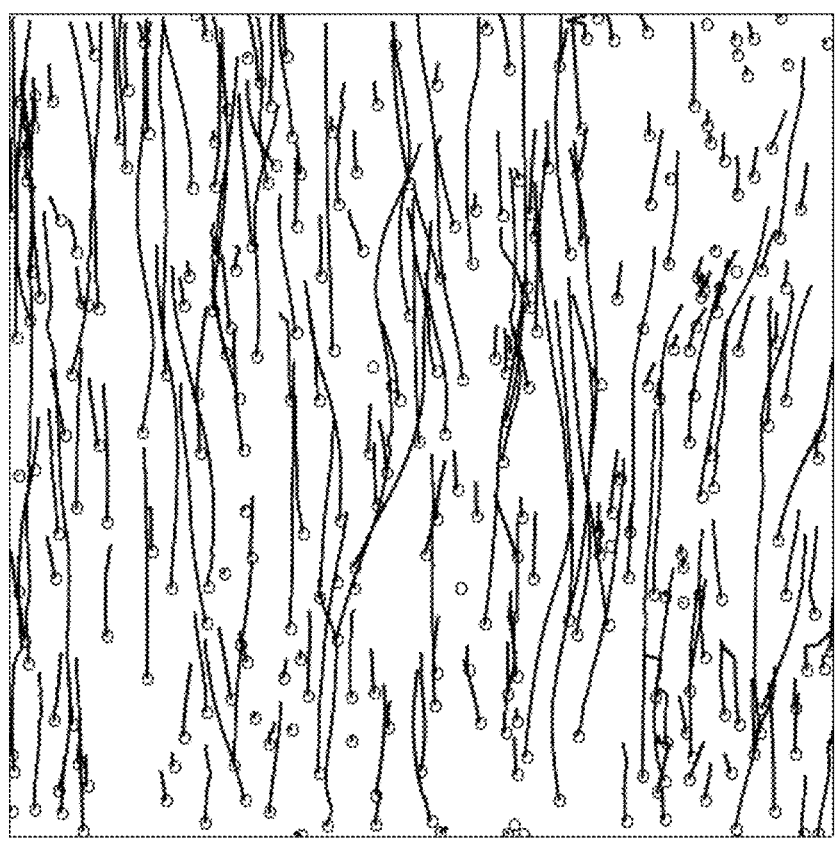
FIG. 13 shows a bubble trajectory obtained by processing bubble motion information included in the example image according to an embodiment of the present disclosure.
Figure 14:
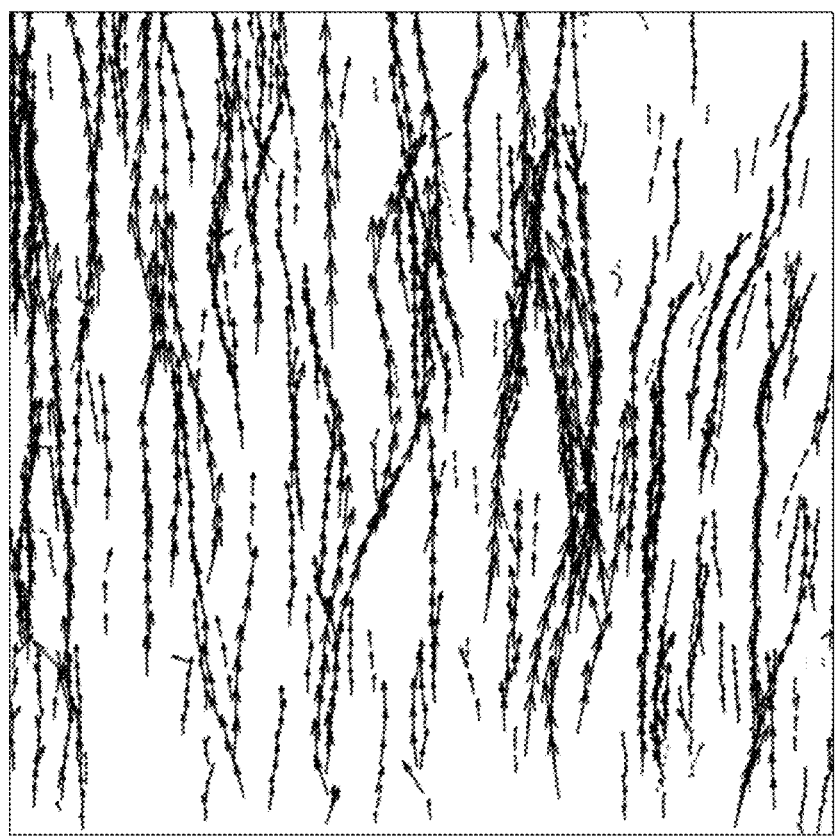
FIG. 14 shows bubble velocity information obtained by processing bubble motion information included in the example image according to an embodiment of the present disclosure.

After the velocity vector of the microbubble is corrected, the velocity vector diagram is overlapped with the initial image of the microbubble group (FIG. 12) to obtain a clear floating process of the microbubble group at each instant. In addition, the mass centroid of the microbubble group after the current instant can also be tracked. The positions of the microbubbles at multiple instants are displayed in the image of the microbubbles at the current instant to obtain the trajectory and velocity of each microbubble, as shown in FIGS. 13 and 14. FIG. 13 shows the trajectory of the microbubbles of multiple instants, and FIG. 14 shows the corresponding velocity information.

The embodiments mentioned above are merely several implementations of the present disclosure. Although the description is specific and detailed, it should not be construed as a limitation to the the present disclosure. It should be noted that people with ordinary skills in the field can further make several variations and modifications without departing from the inventive concept of the present disclosure, and such variations and modifications all fall within the claimed scope of the present disclosure.

What is claimed is:

1. A method for morphological identification, trajectory tracking, and velocity measurement of a high-concentration microbubbles, comprising the following steps:
   1) collecting high time-resolution initial images of microbubbles using a high-speed complementary metal-oxide semiconductor (CMOS) camera;
   2) inputting a high time-resolution initial image of the microbubbles for pre-processing, where the pre-processing comprises binarization, noise removal, filling, and erosion of the high time-resolution initial image; and after the binarization, the gray level of a pixel is set to 1 in a bubble region and 0 in a non-bubble region, thereby providing a pre-processed image;
   3) segmenting, based on a spatial distribution of the microbubbles, overlapped pixel blocks in the pre-processed image, thereby providing a pre-processed, segmented binary image;
   4) identifying a boundary of each microbubble in the pre-processed, segmented binary image, obtaining morphological information of each of the microbubbles, performing morphological matching, calculating an equivalent diameter of all of the microbubbles in a microbubble group, and obtaining diameter distribution information, thereby providing a pre-processed, segmented and identified binary image; and
   5) correlating images of the microbubbles at two adjacent instants, obtaining instantaneous velocity field information of the microbubbles, correcting a velocity vector of the obtained velocity field information, and displaying a motion trajectory and direction of each microbubble in the microbubble group, wherein the operation to correlate images of the microbubbles at two adjacent instants of step 5), comprises:

correlating pre-processed, segmented, and identified binary images of the microbubbles at different instants; selecting a mass centroid of a pixel block of a certain microbubble in an image at a certain instant as a center, and extending a certain width and height in up-down and left-right directions respectively to form a pixel matrix, and denoting the pixel matrix as an interrogation window $W_1$; determining, based on a position of the interrogation window $W_1$ at a current instant, an interrogation window W with a same position, a same width, and a same height as the interrogation window $W_1$ in an image at a next instant; determining all microbubbles comprised in the interrogation window W, and calculating a number of the microbubbles; denoting the number as N, and establishing N interrogation windows $W_2$, each with a same width and height as the interrogation window $W_1$, based on mass centroids of the N microbubbles to form N pixel matrices, where the number of the microbubbles is equal to a number of reference matrices; in the N interrogation windows $W_2$, each interrogation window $W_2$ corresponds to one reference matrix; correlating the pixel matrix corresponding to the interrogation window $W_1$ at the current instant with N reference matrices at the next instant to obtain a correlation coefficient $R_{ij}$; determining a reference matrix with a maximum correlation coefficient as a pixel region corresponding to a microbubble at the center of the interrogation window $W_1$ at the current instant in an image of the microbubble at the next instant; and recording a correspondence between the pixel regions of the two microbubbles;

where the correlation coefficient $R_{ij}$ is calculated as follows:

$$R_{ij} = \frac{\sum (W_1 \cap W_2)}{\sqrt{B_1 \times B_2}},$$

where a numerator of the correlation coefficient is defined by a sum of pixel areas in an overlap region of the interrogation windows $W_1$ and $W_2$; $B_1$ and $B_2$ denote sums of areas of all pixel blocks comprised in the interrogation windows $W_1$ and $W_2$ respectively; i denotes a mark of the microbubble in the center of the interrogation window $W_1$ at the current instant; and j denotes a mark of a microbubble in the center of a certain pixel matrix selected at the next instant.

2. The method for morphological identification, trajectory tracking, and velocity measurement of the high-concentration microbubbles according to claim 1, in which step 2), including the filling and the erosion of the high time-resolution initial image, further comprises:

filtering each pixel block in a binarized high-resolution initial image to find out a pixel with a gray level of 0 in the center of the microbubble, changing the gray level of the pixel to 1, and performing erosion on an edge of each pixel block without affecting a morphology of the microbubble.

3. The method for morphological identification, trajectory tracking, and velocity measurement of the high-concentration microbubbles according to claim 1, wherein step 3) further comprises:
3.1) performing a NOT operation on a pre-processed image of microbubbles obtained through the pre-processing of step 2), and performing distance transformation to obtain a new gray level image;
3.2) multiplying a matrix of the gray level image obtained through the distance transformation by a coefficient of −1, determining pixels with a local minimum gray level from the gray level image, marking a gray level of the pixels with the local minimum gray level as 1, and marking a gray level of pixels without the local minimum gray level as 0 to obtain a new binary image;
3.3) performing distance transformation on the binary image obtained in step 3.2) to obtain a new gray level image;
3.4) performing a watershed transformation on a matrix of the gray level image obtained through the distance transformation in step 3.3) by extracting pixel blocks in a region corresponding to all non-zero gray levels in the gray level image and labeling each corresponding microbubbles; and marking gray levels of pixels in the same bubble region to obtain a new gray level image;
3.5) converting the gray level image obtained in step 3.4) into a binary image, setting gray levels of all pixels in the bubble region to 0 and gray levels of pixels in a non-bubble region to 1 to prepare for subsequent extraction of a bubble segmentation boundary and obtain a new binary image; and performing a NOT operation on the new binary image to obtain a new matrix as a segmentation factor matrix; and
3.6) multiplying the segmentation factor matrix by the matrix corresponding to the pre-processed image obtained through the pre-processing in step 2) to obtain the pre-processed, segmented binary image.

4. The method for morphological identification, trajectory tracking, and velocity measurement of the high-concentration microbubbles according to claim 1, wherein identifying the boundary of the pre-processed, segmented binary image, obtaining morphological information of each of the microbubbles, and performing morphological matching of step 4), further comprises:
performing ellipse fitting on a boundary of each microbubble, determining an ellipse that best conforms to the boundary of the microbubble thereby providing an ellipse, recording major and minor axes of the ellipse, and determining mass centroid information.

5. The method for morphological identification, trajectory tracking, and velocity measurement of the high-concentration microbubbles according to claim 4, wherein performing ellipse fitting on the boundary of each microbubble, determining the ellipse that best conforms to the boundary of the microbubble, recording major and minor axes of the ellipse, and determining mass centroid information of step 4), further comprises:
performing ellipse fitting on the boundary of each microbubble in the pre-processed, segmented binary image of a microbubble in two-dimensions (2D), and setting horizontal and vertical coordinates of a pixel on a fitted elliptic boundary as x and y respectively, in which coordinates of pixels on an elliptic boundary of the microbubble satisfy an elliptic equation if the ellipse matches the boundary of the microbubble;
when ellipse fitting is performed on the boundary of the pre-processed, segmented binary image of the microbubble in 2D, the coordinates of the pixel on the elliptic boundary satisfies a condition that a sum s of squares of x/a and y/b obeys a chi-square distribution; a confidence interval $P(s<\lambda)$ is given in a cumulative chi-square distribution, and $\lambda$ is a constant; and an appropriates value of an elliptic boundary for fitting the pixel of the microbubble is determined, such that the fitted elliptic boundary most accurately reflects morphology of the microbubble;
a semi-major axis and semi-minor axis of the elliptic equation are related to standard deviations of x and y coordinate sets in respective directions; and the standard deviations and the s value are determined to obtain semi-major axis a and semi-minor axis b of the ellipse; and
outputting a label matrix comprising a pixel area and mass centroid of each microbubble after obtaining an independent pixel region of the microbubble, in which the mass centroid of each microbubble is recorded by the label matrix.

6. The method for morphological identification, trajectory tracking, and velocity measurement of the high-concentration microbubbles according to claim 4, wherein calculating the equivalent diameter of all of the microbubbles in the microbubble group and obtaining the diameter distribution information of step 4), further comprises:
obtaining a particle size of each microbubble based on semi-major and semi-minor axes corresponding to an elliptic boundary of each microbubble,
calculating proportions of different particle sizes of the microbubbles, and obtaining a distribution of particle sizes.

7. The method for morphological identification, trajectory tracking, and velocity measurement of the high-concentration microbubbles according to claim 1, wherein obtaining instantaneous velocity field information of the microbubble group of step 5), further comprises:
calculating a change rate of displacement to time according to a correspondence of each microbubble at different instants to obtain velocity and direction information; and
marking a velocity vector in an initial high time-resolution image of the microbubbles;
in which a bubble position changes slightly in each image of the microbubbles taken by the high-speed CMOS camera at each instant; and after bubble positions at different instants are correlated, taking a change rate of each microbubble's displacement to time as a velocity at the current instant, and obtaining a velocity field of all the microbubbles at each instant.

8. The method for morphological identification, trajectory tracking, and velocity measurement of the high-concentration microbubbles according to claim 1, wherein displaying motion trajectory and direction of the microbubble group of step 5), further comprises:
determining a correspondence of each microbubble at different instants based on obtained correlation information of the microbubble to determine a motion direction of the microbubble;
overlapping motion positions of each microbubble at different instants in the high time-resolution initial image to obtain a motion trajectory of each microbubble; and
marking velocity vectors of the microbubbles on the high-time resolution initial image of the microbubbles to visualize a velocity field of the microbubbles.

* * * * *